Patented Apr. 3, 1934

1,953,353

UNITED STATES PATENT OFFICE 1,953,353

PROCESS OF TREATING HYDROCARBON OILS

Arthur Lazar, Associated, and John M. Evans, Berkeley, Calif., assignors to Associated Oil Company, San Francisco, Calif., a corporation of California No Drawing. Application August 19, 1930, Serial No. 476,440

5 Claims. (Cl. 196—1)

Mineral oils are mixtures of hydrocarbons of different structure known as paraffines, naphthenes, olefines, and aromatics. In addition to those, in most of the crude oils and consequently in the distillates obtained from them, there is a comparatively small amount of non-hydrocarbons present, such for instance as sulfur compounds, nitrogen compounds, and products of acid character like phenols and naphthenic acids. The presence of those non-hydrocarbons in finished products is more or less objectionable. The organic acids as an example are highly undesirable in those mineral oil products which come in contact with metal surfaces because the naphthenic acids, for instance, are known for their tendency to corrode most of the non-noble metals, forming naphthenic acid soaps which are soluble in the oil.

Besides the destructive damage they do to metal parts, such dissolved metal soaps may easily initiate certain chemical reactions in the oil itself which finally will lead to the formation of sludge and sediment, and, acting as catalysts, such soaps also accelerate the decomposition of the oil by oxidation during use. For this reason the removal of the naphthenic and like acids is a very important item in the refining of oils and this holds particularly true for lubricating oils.

Considering the acid character of those particular impurities coming under the general name of organic acids, their removal from distillate might seem as easy matter merely by an agitator treatment with a caustic soda solution, but here is where difficulty arises. Every refiner has encountered serious emulsion troubles in the step of neutralization with caustic soda solution when applied to oils containing naphthenic acids. It is a fact that for distillates from each individual crude a separate process of neutralization has to be worked out, which is a very delicate operation because the temperatures and concentrations have to be controlled very painstakingly, otherwise the whole batch turns into an emulsion. Naturally the refiners have always been endeavoring to evade such troublesome processes of neutralization.

Some time ago it became common practice to prevent organic acids from going over with the distillate by carrying out the distillation process in the presence of solid alkali, preferably caustic soda or lime. This method renders distillates perfectly neutral and consequently eliminates all the above mentioned emulsion troubles.

However, by eliminating the emulsion troubles, other difficulties, sometimes even more serious, are encountered in the distilling apparatus by this method. There is always danger involved in having an inorganic solid mixed with the crude oil and having the mixture exposed to high temperatures in the stills due to the possibilities of depositing precipitates inside the still, which result in local superheating and eventually burning out the still bottoms, or, still pipes. Another important item is that the residuum gets contaminated with the sodium soaps and no economically justifiable method has been found yet to separate the soaps from the residuum. In other words, the residuum is discharged with a content of sodium ash, a fact which involves considerable difficulties in using it as fuel.

In consideration of all these facts a method was very desirable which eliminated the naphthenic acids altogether without the use of caustic.

While studying thermal decomposition of various crudes and distillates it was found that a good deal of the non-hydrocarbons contained in the mineral oils break down before any appreciable decomposition of the hydrocarbons themselves takes place. This breakdown is indicated by the liberation of hydrogen sulfide and carbon dioxide gas.

The first can generally be observed in any oil process connected with decomposition, not only in actual cracking, but even in a mere distilling process. The hydrogen sulfide has its source in the decomposition of the less stable sulfur compounds. The carbon dioxide gas could be shown to have its origin in the decomposition of the organic acids contained in the oil, this decomposition being given by the general equation

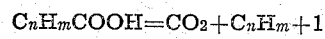
$$C_nH_mCOOH = CO_2 + C_nH_{m+1}$$

which means that the carboxyl group of the organic acid splits up to form a hydrocarbon molecule and carbon dioxide.

When a heavy topped crude known to contain organic acids is heated up to a certain temperature for a certain length of time, and the crude thereafter is subjected to the usual distilling process (no matter whether this is done under vacuum or at atmospheric pressure, with or without steam), the distillates were found to be perfectly neutral, whereas the same topped crude directly subjected to a distillation without the previous heat treatment yields distillates having acidities varying from 2.5 to 3.0 Mg.KOH per gram of oil.

This observation could not only be verified with crude oils, but with any heavy mineral oil distillates obtained by the usual distillation without neutralizing agents, and consequently containing organic acids. Such oils were found to lose completely their acidity by a heat treatment as described above.

Naturally it is very nearly impossible to find conditions of heat and time where the decomposition of the organic acids would be complete without a certain amount of breakdown of the hydrocarbons. But, under such conditions it is found that the most unstable hydrocarbons of the mineral oils are affected first, and the finished product from such a heat treated raw material is more stable against heat and will prove to be a better product, providing certain heavy and asphaltic like products formed during the heat treatment are removed by a succeeding treatment for their elimination.

It is found, furthermore, that the more saturated the character of an oil, the less breakdown of hydrocarbons takes place during a heat treatment at temperatures necessary for decomposing the organic acids, this being especially applicable to distillates such as saturated hydrocarbons which have been first submitted to treatment with liquid $SO_2$ by the well-known Edeleanu process, and which proves to be highly suitable for such a heat treatment.

Starting with a distillate of high organic acidity, the $SO_2$ treatment itself removes most of the unstable hydrocarbons, but it does not remove therewith all the organic acids, so that the remainder in the refined portion will cause trouble in further treatment.

It is found that any trace of organic acids can be eliminated from such an $SO_2$ treated oil by a heat treatment, and that at the same time the breakdown of valuable hydrocarbons can be reduced to a minimum. It might be mentioned also that mineral oils pretreated by other physical or chemical refining processes will give similar results to those which have been subjected to the $SO_2$ treatment.

After the pretreatment, care has to be taken in any case that heavy asphaltic like compounds which more or less have been formed during the heat treatment by polymerization, are removed by a suitable aftertreatment and there are many ways possible to do this.

In the case of crude oils, the distillation following the heat treatment takes care of the removal of the heavy asphaltic compounds which will stay in the residuum. In the case of a distillate or a treated oil, the heat treatment will have to be followed by either redistillation or a treatment with adsorptive material such as clay, or by any kind of a treatment as used ordinarily on mineral oils. This could be either a physical process with a selective solvent like the above mentioned Edeleanu process using liquid $SO_2$ as a treating agent, or a chemical process like the ordinary method of treating with $H_2SO_4$.

In either event it can be demonstrated that besides the destruction of non-hydrocarbons composed of organic acids, etc., the heat treatment followed by suitable processing brings about a considerable increase in stability of the finished product, both as to color and effects from heat.

In general the process includes the heating of an oil to a temperature at which the non-hydrocarbons will crack and the hydrocarbons will not crack, without distillation, such temperature being below the point at which any substantial cracking of the hydrocarbons will occur within the time period allowed for the cracking of the non-hydrocarbons.

Such heating step is then followed by a suitable processing of the hydrocarbons, which may be distillation or chemical or physical treatment, or a combination of these.

The temperatures employed will vary with the oil under treatment. In case of a crude oil or a raw distillate, the temperature where cracking occurs will be lower than in cases where an oil has been treated. It was found along this line particularly that such oils as are obtained by treatment with liquid $SO_2$ are sufficiently stable to allow heating to the point where the non-hydrocarbons break down without any appreciable decomposition of hydrocarbons. The temperatures necessary to obtain this effect vary with the source of the oil within the range of 600–750° F.

We claim as our invention:

1. A process for removing objectionable, liquid non-hydrocarbons, such as phenols and naphthenic acids, from an uncracked, topped crude oil, or a distillate thereof of such boiling range that no substantial loss by distillation will occur at the treatment temperature, which consists in subjecting such a hydrocarbon oil, while under atmospheric pressure, to a temperature at which the objectionable organic acids will be decomposed and can be separated out, such temperature, between 600° F. and 750° F., causing no substantial decomposition or distillation of the desired hydrocarbons.

2. A process for removing objectionable, liquid non-hydrocarbons, such as phenols and naphthenic acids, from an uncracked, topped crude oil, or a distillate thereof of such boiling range that no substantial loss by distillation will occur at the treatment temperature, which consists in subjecting such a hydrocarbon oil, while under atmospheric pressure, to a temperature at which the objectionable organic acids will be decomposed and can be separated out, such temperature, between 600° F. and 750° F., causing no substantial decomposition or distillation of the desired hydrocarbons within the period necessary to decompose the phenols and naphthenic acids.

3. The process of claim 1 in which the hydrocarbon oil consists mainly of saturated hydrocarbons.

4. The process of claim 1 in which the decomposed portions of the organic acids are separated out by distillation.

5. The process of claim 1 in which the hydrocarbon oil is a distillate such as saturated hydrocarbons which have been first submitted to treatment with liquid sulphur dioxid.

ARTHUR LAZAR.
JOHN M. EVANS.